United States Patent [19]
Chi

[11] Patent Number: 5,632,561
[45] Date of Patent: May 27, 1997

[54] BEARING ASSEMBLY FOR A BOTTOM BRACKET OF A BICYCLE

[76] Inventor: Yi C. Chi, No. 139-5, An Mei Rd., Mei Shan Village, Hou Li Hsiang, Taichung Hsien, Taiwan

[21] Appl. No.: 314,874

[22] Filed: Sep. 29, 1994

[51] Int. Cl.$^6$ ................................................. F16C 33/58
[52] U.S. Cl. ........................... 384/458; 384/512; 384/515
[58] Field of Search .................................... 384/512, 458, 384/457, 515, 513, 540

[56] References Cited

U.S. PATENT DOCUMENTS

| | | | |
|---|---|---|---|
| 4,363,493 | 12/1982 | Veneklasen | 280/11.2 |
| 4,545,691 | 10/1985 | Kastan et al. | 384/458 |
| 4,611,933 | 9/1986 | Hofmann et al. | 384/512 |
| 4,808,147 | 2/1989 | Graham | 384/458 |

*Primary Examiner*—Lenard A. Footland
*Attorney, Agent, or Firm*—Peterson, Wicks, Nemer & Kamrath, P.A.

[57] ABSTRACT

A bearing assembly of a bottom bracket for a bicycle, the bottom bracket includes an axle, at least one bearing, a tube and a housing, the tube engaged in the housing and the axle rotatably engaged in the tube by at least one bearing disposed therebetween. The tube has at least one annular recess defined in an inner periphery thereof and the axle has a threaded portion for threadedly engaging to a race which has an annular recess defined in an outer periphery thereof. The bearing is received between the annular recess of the tube and the annular recess of the race, an abutment between the tube and the bearing defining a first arc on a vertical plane passing through a center of the bearing, the first arc having an upper distal point and a lower distal point, the upper distal point located in the first (or the second) quadrant of the vertical plane with regard to a right-angle coordinate which has an origin of ordinates at the center of the bearing. An abutment between the race and the first bearing defining a second arc on the vertical plane, the second arc having an upper distal point and a lower distal point, the lower distal point located in the third (or the fourth) quadrant of the coordinate.

6 Claims, 5 Drawing Sheets

5,632,561

BEARING ASSEMBLY FOR A BOTTOM BRACKET OF A BICYCLE

BACKGROUND OF THE INVENTION

The present invention relates to a bearing assembly and, more particularly, to an improved bearing assembly of a bottom bracket for a bicycle.

A conventional bottom bracket is shown in FIG. 1, which is disposed to the connecting point of the seat tube, down tube and the chain stay (figures not shown) to house rotatably cranks and pedals (figures not shown), the bottom bracket includes an axle 90, a tube 92, two caps 84 and a housing 80. The axle 90 having first and second ends is rotatably engaged within the tube 92 which has first and second ends and a threaded portion defined in an outer periphery of each of the first and second ends thereof for engagement with the housing 80. A threaded portion 902 is defined in an outer periphery of the first end of the axle 90, and the caps 84 are mounted on both ends of the housing 80 for keeping dust from entering therein. Two bearings 93, 94 are disposed between the axle 90 and the tube 92 to provide a better rotational efficiency. In order to maintain a position of the bearing 94, a race 95, a washer 962 and a nut 96 are threadedly mounted on the thread section 902 of the axle 90, the race 95 has an annular recess 952 defined in an outer periphery thereof and the tube 92 has a first annular recess 924 defined in an inner periphery of the first end thereof such that the bearing 94 is rotatably received therebetween. The axle 90 has an annular recess 91 defined in the outer periphery of the second end thereof and the tube 92 has a second annular recess 922 defined in the inner periphery of the second end thereof such that the bearing 93 is rotatably received therebetween.

However, as a bicycle often encounters rough and uneven terrain, especially for a mountain bike, the engagements of the bearings 93, 94 between the tube 92 and the axle 90 and the race 95 tends to become loose. Referring to FIG. 2, taking an engagement between the bearing 94, the race 95 and the tube 92 as an example, the engagement between the bearing 94 and the tube 92 has a first arc formed on an imaginary vertical plane (figure not shown) passing through a center O of the bearing 94, and the first arc has an upper distal point A and a lower distal point C. The engagement between the bearing 94 and the race 95 has a second arc formed on the imaginary vertical plane and the second arc has an upper distal point D and a lower distal point B. The points A and B are located on a vertical line L passing through the center O of the bearing 94, i.e., an angle between the vertical line L and the segment OA and OB are both equal to 0 degrees, such that when a force f is horizontally exerted to the bearing 94, the points A and B cannot dispense the force f, therefore, a stress concentration is occurred at the point C and D of the tube 92 and the race 95 respectively.

The present invention intends to provide an improved bearing assembly to mitigate and/or obviate the above-mentioned problems.

SUMMARY OF THE INVENTION

The present invention is a bearing assembly of a bottom bracket for a bicycle, the bottom bracket including a housing in which an axle is rotatably engaged by disposing two bearings between a race and a tube, the axle having a first end having a threaded portion defined in an outer periphery thereof and a second end having an annular recess defined in the outer periphery thereof, the race threadedly engaged to the threaded portion of the axle and having an annular recess defined in an outer periphery thereof, the tube having first and second ends and which has a first annular recess and a second annular recess defined in an inner periphery thereof respectively. An imaginary vertical plane longitudinally passes through the bottom bracket and a center O of each of the bearings such that the vertical plane intersects the tube and the race so as to form a first and a second arc, and intersects the tube and the axle to form the third and the fourth arcs respectively. Each arc has an upper and a lower distal point, the upper distal points of the first and second arcs are located in the first quadrant of a right-angle coordinate which has an origin ordinates at the center of the first bearing, and the lower points of the first and second arcs are located in the third quadrant of the coordinate. The upper distal points of the third and the fourth arcs are located in the second quadrant of a right-angle coordinate which has an origin of ordinates at the center of the second bearing, and the lower distal points of the third and the fourth arcs are located in the fourth quadrant of the coordinate.

It is an object of the present invention to provide a bearing assembly of the bottom bracket, wherein each of the bearings is enclosed by the elements such as the tube, the race and the axle about 210 to 260 degrees.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
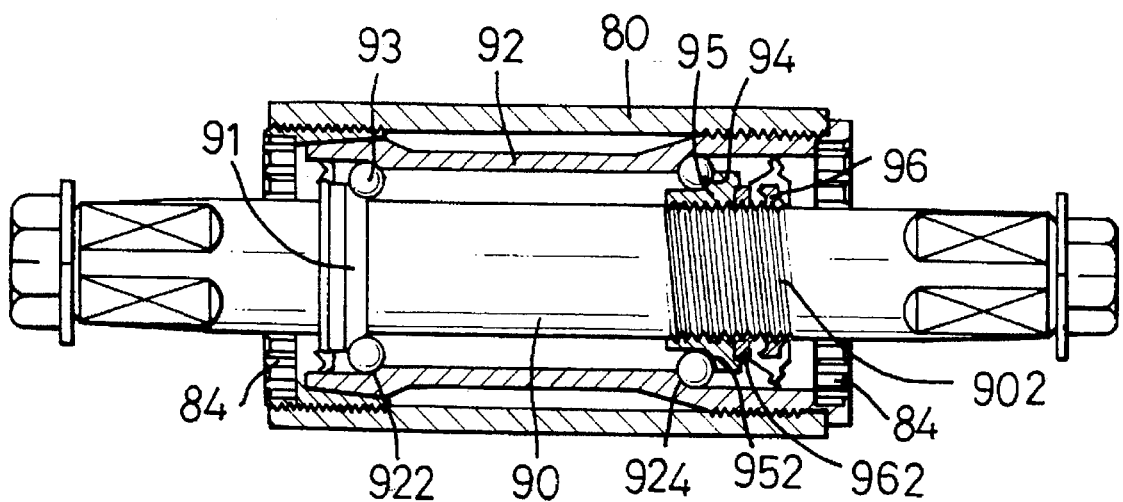
FIG. 1 is a side elevational view in cross-section of a conventional bottom bracket.
Figure 2:
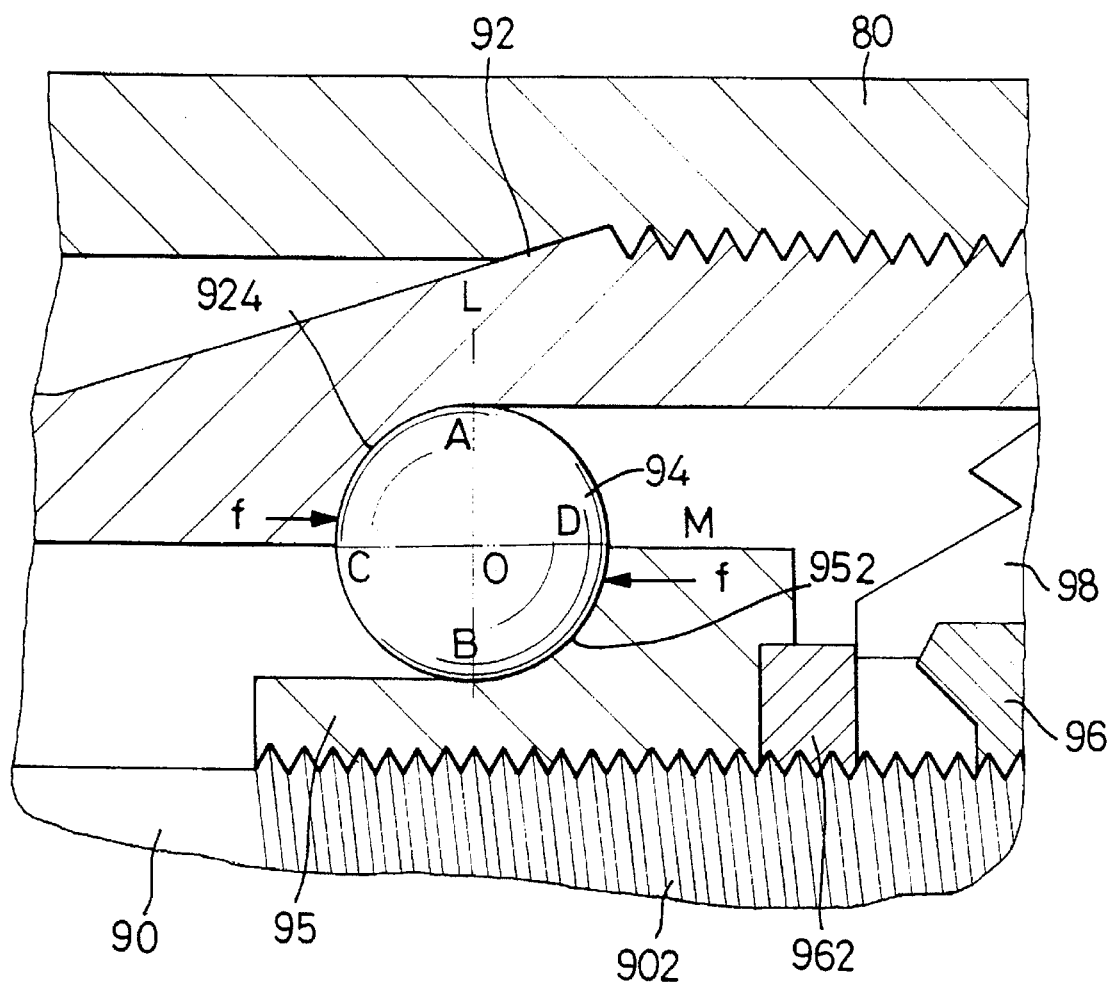
FIG. 2 is an enlarged side elevational view, partly in section, of part of the conventional bottom bracket.
Figure 3:
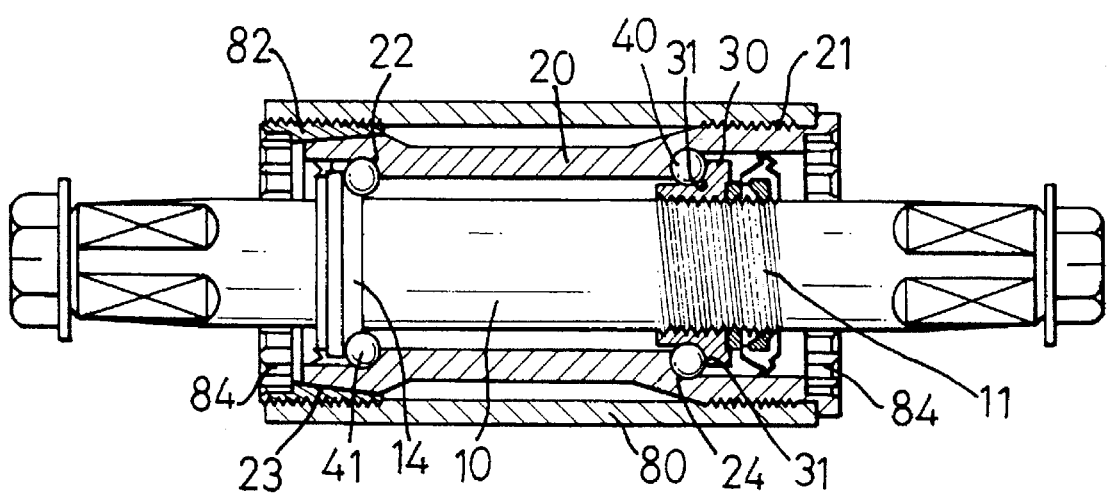
FIG. 3 is a side elevational view in cross-section of a bottom bracket in accordance with the present invention.
Figure 4:
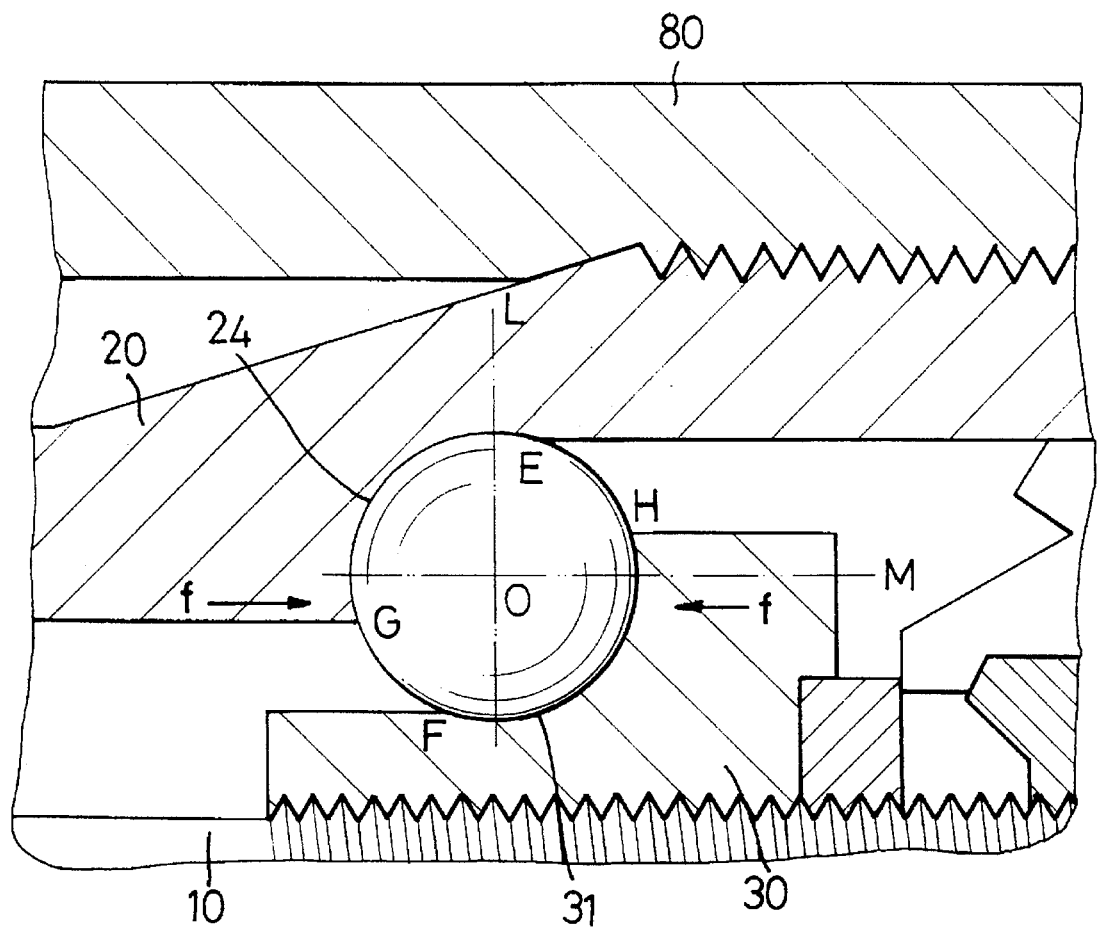
FIG. 4 is an enlarged side elevational view, partly in section, of the first bearing assembling of the bottom bracket in accordance with the present invention.

Referring to FIGS. 3 and 4, a bottom bracket assembly generally includes an axle 10, a first and a second bearings 40, 41, a tube 20 and a housing 80. The axle 10 is rotatably engaged in the tube 20 by disposing the first and the second bearings 40, 41 therebetween. The axle 10 has a first end in which a threaded portion 11 is defined in an outer periphery thereof, and a second end in which an annular recess 14 is defined in the outer periphery thereof, the tube 20 has a first end which has a threaded section 21 defined in an outer periphery thereof for engaging to an inner periphery of the housing 80 and an annular recess 24 defined in an inner periphery thereof, and a second end which has a tapered portion 23 defined in the outer periphery thereof and an annular recess 22 defined in the inner portion thereof so as to receive the second bearing 41 therein with the annular recess 14 of the axle 10. A race 30 is threadedly engaged to the threaded portion 11 and an annular recess 31 is defined in an outer periphery thereof so as to receive the first bearing 40 therein with the first annular recess 24 of the tube 20. A ring element 82 has a threaded portion defined in an outer periphery thereof for engaging to the inner periphery of the housing 80 and a tapered portion defined in an inner periphery thereof for engaging to the tapered portion 23 of the tube 20. A cap 84 is respectively force-fitted in the first end of the ring element 82 and the tube 20.

Referring to FIG. 4, an imaginary vertical plane (figure not shown) passing through a longitudinal central axis of the bottom bracket and a center O of the first bearing 40 intersects the bottom bracket in accordance with the present invention and therefore forms a first intersecting arc between the first bearing 40 and the tube 20, and a second intersecting arc between the first bearing 40 and the race 30. Each of the first and second arcs has an upper distal point E/H and a lower distal point G/F, wherein the points E and H are located in the first quadrant of a right-angle coordinate on the vertical plane, which has an origin of ordinates at the center of the first bearing 40, and the points G and F are located in the third quadrant of the coordinate. An angle between the segment OE/OF and a vertical line L passing through the center O of the first bearing 41 is within a range of 15 to 20 degrees, and an angle between the segment OG/OH and the horizontal line M passing through the center O of the bearing 40 is within a range of 15 to 20 degrees.

Figure 5:
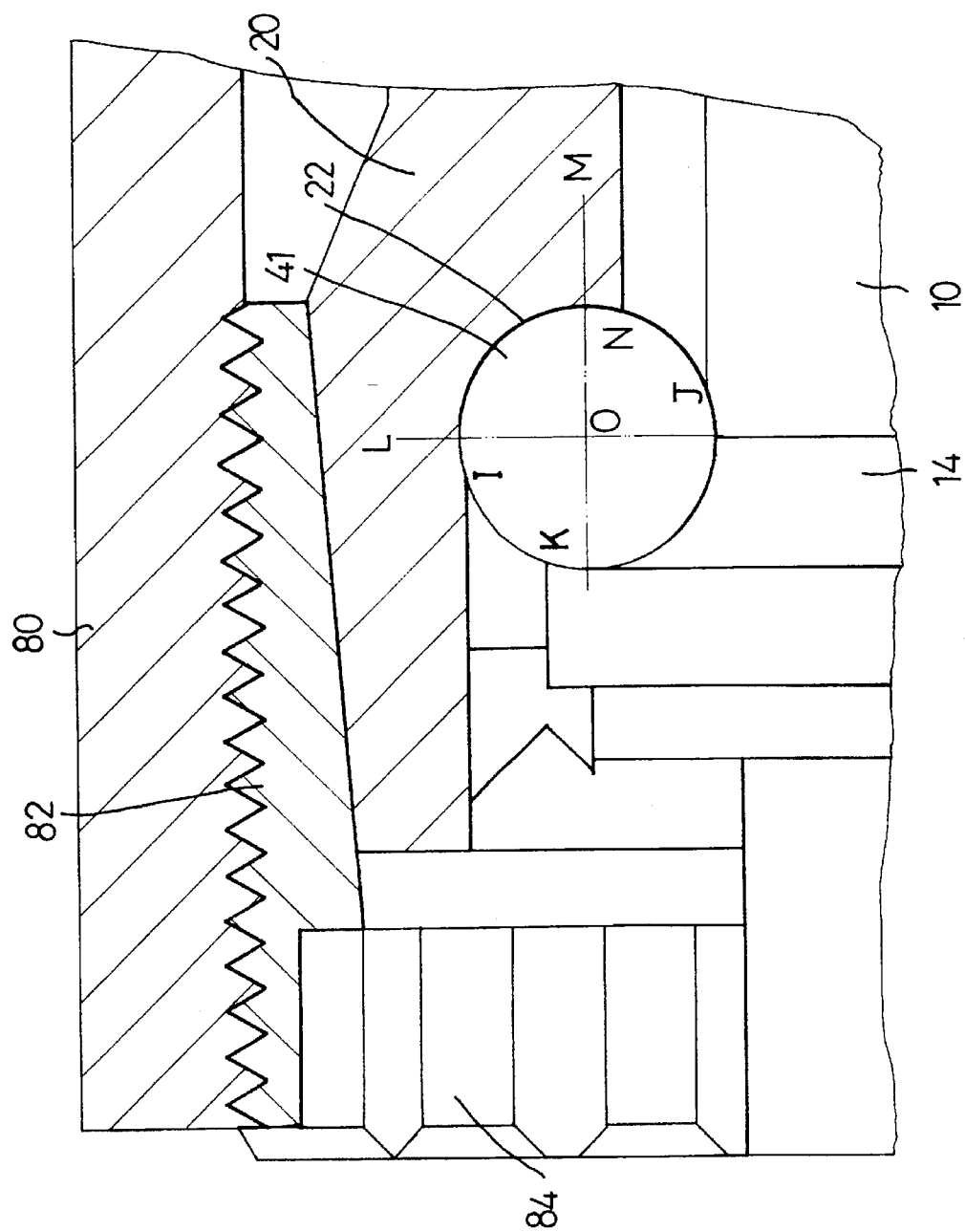
FIG. 5 is an enlarged side elevational view, partly in section, of the second bearing assembly of the bottom bracket in accordance with the present invention.

Referring to FIG. 5, the imaginary vertical plane mentioned above also intersects the tube 20, the second bearing 41 and the axle 10 to form a third intersecting arc between the second bearing 41 and the tube 20, and a fourth intersecting arc between the second bearing 41 and the axle 10. Each of the third and fourth arcs has an upper distal point I/K and a lower distal point N/J, wherein the points I and K are located in the second quadrant of a right-angle coordinate which has an origin of ordinates at the center of the second bearing 41, and the points N and J are located in the fourth quadrant of the coordinate. An angle between the segment OI/OJ and a vertical line L passing through the center O of the second bearing 41 is within a range of 15 to 20 degrees, and an angle between the segment ON/OK and the horizontal line M through the center O of the second bearing 41 is within a range of 15 to 20 degrees.

Accordingly, the first and second bearings 40, 41 are rotatably received by a larger range between the race 30, the tube 20 and the tube 20, the axle 10 respectively, such that the force f horizontally exerted to the bearing 41 is dispensed efficiently and the drawback of the stress concentration of the conventional bottom bracket is therefore improved.

Although the invention has been explained in relation to its preferred embodiment, it is to be understood that many other possible modifications and variations, such as being utilized in the structure of a hub or a head set of a bicycle, can be made without departing from the spirit and scope of the invention as hereinafter claimed.

I claim:

1. A bearing assembly of a bottom bracket for a bicycle, said bottom bracket comprising an axle, at least one bearing, a tube and a housing, said tube engaged in an inner periphery of said housing and said axle rotatably engaged in an inner periphery of said tube by said bearing, said tube having at least one annular recess defined in said inner periphery thereof and said axle having a threaded portion for threadedly engaging to a race which has an annular recess defined in an outer periphery thereof, said bearing being received between said annular recess of said tube and said annular recess of said race;

an abutment between said tube and said bearing defining a first arc on a vertical plane passing through a center of said bearing, said first arc having an upper distal point or a lower distal point, said upper distal point located in the first or the second quadrant of a right-angle coordinate which has an origin of ordinates at said center of said bearing;

an abutment between said race and said bearing defining a second arc on said vertical plane passing through said center of said bearing, said second arc having an upper distal point or a lower distal point, said lower distal point located in the third or the fourth quadrant, respective to the distal points of the first arc, of said vertical plane passing through said center of said bearing.

2. The bearing assembly as claimed in claim 1 wherein said lower distal point of said first arc is located in the third or the fourth quadrant of said coordinate, said upper distal point of said second arc is located in the first or the second quadrant, respective to the distal points of the second arc, of said coordinate.

3. The bearing assembly as claimed in claim 1 wherein a segment connecting said upper distal point of said first arc and said center of said bearing has an angle 15 to 20 degrees between a vertical line passing through said center of said bearing.

4. The bearing assembly as claimed in claim 1 wherein a segment connecting said lower distal point of said second arc and said center of said bearing has an angle 15 to 20 degrees between a vertical line passing through said center of said bearing.

5. The bearing assembly as claimed in claim 1 wherein a segment connecting said lower distal point of said first arc and said center of said bearing has an angle 15 to 20 degrees between a horizontal line passing through said center of said bearing.

6. The bearing assembly as claimed in claim 1 wherein a segment connecting said upper distal point of said second arc and said center of said bearing has an angle 15 to 20 degrees between a horizontal line passing through said center of said bearing.

* * * * *